Figure 1:
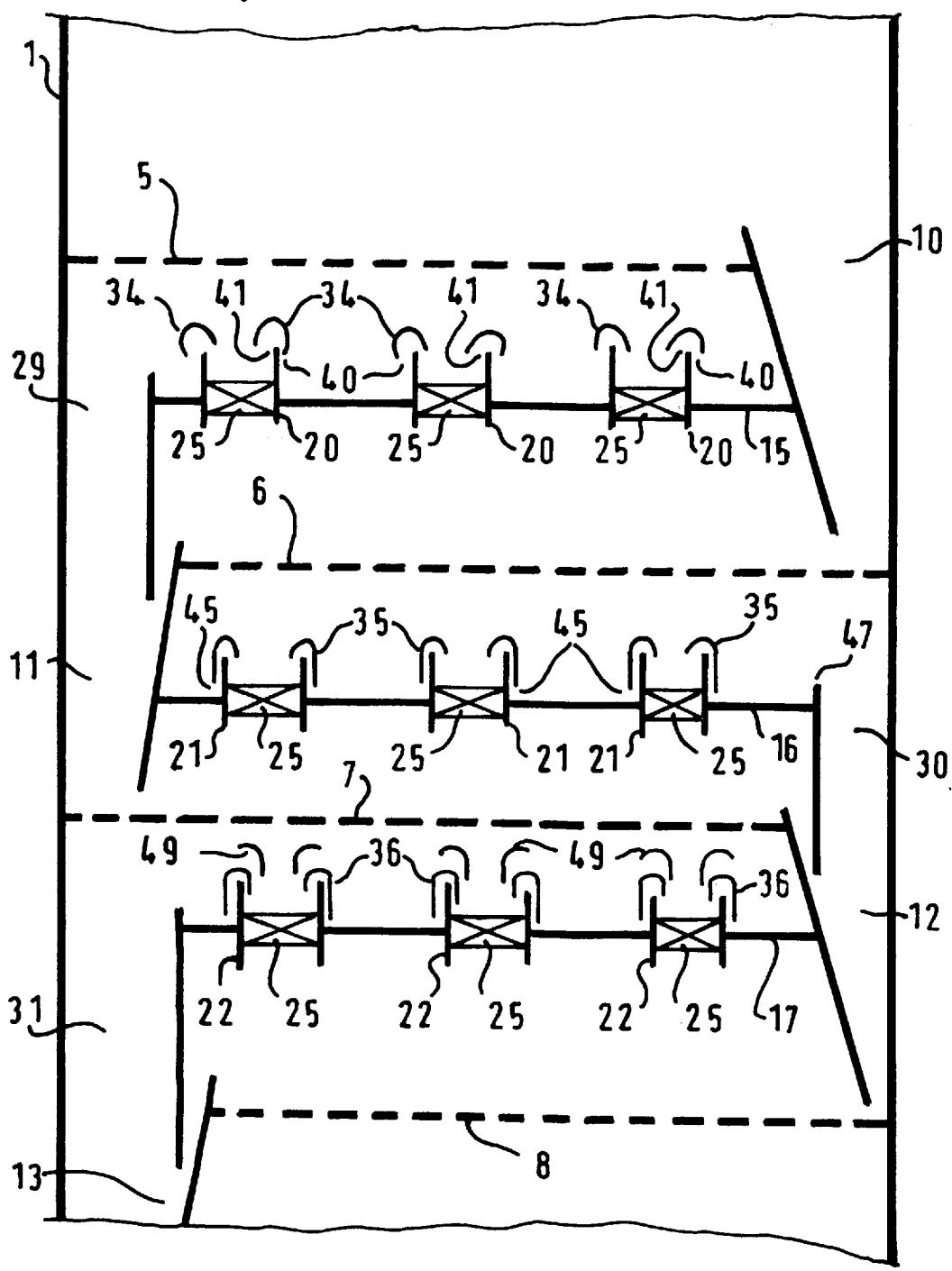

United States Patent [19]
Konijn

[11] Patent Number: 5,885,488
[45] Date of Patent: Mar. 23, 1999

[54] COLUMN FOR COUNTER-CURRENTLY CONTACTING GAS AND LIQUID

[75] Inventor: Gerrit Konijn, Amsterdam, Netherlands

[73] Assignee: Shell Oil Company, Houston, Tex.

[21] Appl. No.: 555,059

[22] Filed: Nov. 8, 1995

[51] Int. Cl.[6] .................................................. B01F 3/04
[52] U.S. Cl. ...................... 261/79.2; 261/114.1; 96/306
[58] Field of Search ............................. 261/79.2, 114.1; 55/237

[56] References Cited

U.S. PATENT DOCUMENTS

| | | | |
|---|---|---|---|
| 1,983,762 | 12/1934 | Kotzebue | 261/114.1 |
| 3,498,028 | 3/1970 | Trouw | 261/79.2 |
| 3,605,388 | 9/1971 | Zuiderweg et al. | 261/79.2 |
| 3,788,045 | 1/1974 | Arnold et al. | 261/79.2 |
| 4,752,307 | 6/1988 | Asmus et al. | 261/79.2 |
| 4,880,451 | 11/1989 | Konijn | 261/79.2 |

*Primary Examiner*—Tim R. Miles

[57] ABSTRACT

Column (1) for counter-currently contacting gas and liquid having a gas inlet and a liquid outlet arranged in its lower end and a liquid inlet and a gas outlet arranged in its upper end, which column is provided with a plurality of horizontal contact trays (5, 6, 7, 8) arranged axially spaced apart in the column (1), each contact tray (5, 6, 7, 8) being provided with gas passages and a downcomer (10, 11, 12, 13) opening below the contact tray (5, 6, 7, 8), and with a plurality of horizontal separation trays (15, 16, 17) provided with swirl tubes (20, 21, 22) and with means (29, 30, 31) for removing liquid from the separation tray (15, 16, 17), each separation tray (15, 16, 17) being arranged above a contact tray (6, 7, 8), wherein each swirl tube (20, 21, 22) is provided with an annular U-turn deflector (34, 35, 36) arranged over the upper end of the swirl tube (20, 21, 22).

6 Claims, 2 Drawing Sheets

COLUMN FOR COUNTER-CURRENTLY CONTACTING GAS AND LIQUID

I. FIELD OF THE INVENTION

The invention relates to a normally vertical column for counter-currently contacting gas and liquid to exchange heat and/or matter between the gas and the liquid.

II. BACKGROUND OF THE INVENTION

In counter-currently contacting, gas flows upwards and liquid flows downwards through the column. To allow contacting of upwardly flowing gas and downwardly flowing liquid, the column is provided with a plurality of horizontal contact trays arranged axially spaced apart in the column, wherein each contact tray is provided with gas passages and a downcomer which opens below the contact tray.

In the specification and in the claims the word 'downcomer' is used to refer to a conduit for downward transport of liquid from a tray, wherein the inlet end of the conduit is provided with a weir extending above the tray. The weir can be part of the downcomer or the weir can be separately arranged on the tray.

During normal operation, gas flows upwards through the gas passages of the contact tray and liquid is supplied onto the contact tray through the downcomer of the next higher contact tray. Liquid collected on the tray forms a layer and contacting of gas and liquid takes place in the layer of liquid on the contact tray. Liquid flowing over the weir is removed through the downcomer, and gas disengaged from the liquid on the contact tray flows upwards to the next higher contact tray on which it is again contacted with liquid.

To reduce the amount of liquid entrained with the gas that flows to the next higher contact tray it has been proposed in U.S. Pat. No. 1,983,762 to Kotzebue to provide the column with a plurality of horizontal separation trays provided with swirl tubes and with means for removing liquid from the separation tray, wherein each separation tray is arranged above a contact tray. The next higher contact tray is then arranged above the separation tray.

The swirl tube is a cylindrical pipe in which swirl imparting means are arranged. During normal operation, gas with entrained liquid flows through the swirl tube and the swirl imparting means cause the gas to rotate; under influence of centrifugal forces, entrained liquid moves away from the center of the swirl tube and is collected on the inner surface of the cylindrical pipe where a film of liquid is formed. At the upper end of the pipe, the liquid film breaks up and liquid droplets move away from the pipe; these liquid droplets should fall on the separation tray. The path of some of the liquid droplets will be such that they hit the contact tray above the separation tray, and they are entrained through the gas passages of that contact tray. To reduce this entrainment, the upper ends of the swirl tubes discharge straight into the gas passages of the contact tray above the separation tray, so that the gas flows towards the gas passages of the contact tray and the liquid hits the contact tray around the gas passages. Also, the known separation tray comprises as many swirl tubes as there are gas passages in the next higher contact tray, and the diameter of the swirl tubes is equal to the diameter of the gas passages in the next higher contact tray. And the layout of the swirl tubes is similar to the lay out of the gas passages, consequently the net free area of the known separation tray equals the net free area of the contact tray, wherein the net free area of the separation tray is the area of the passages in the swirl tubes divided by the active area of the separation tray, and wherein the net free area of the contact tray is the area of the gas passages divided by the active area of the contact tray.

It is an object of the present invention to provide a separation tray which contains a much smaller number of swirl tubes which have a diameter that is larger than the diameter of the gas passages.

III. SUMMARY OF THE INVENTION

To this end the column for counter-currently contacting gas and liquid according to the present invention provided with inlets and outlets for fluids, which column is provided with a plurality of horizontal contact trays arranged axially spaced apart in the column, each contact tray being provided with gas passages and a downcomer opening below the contact tray, and with a plurality of horizontal separation trays provided with swirl tubes and with means for removing liquid from the separation tray, each separation tray being arranged above a contact tray, wherein each swirl tube is provided with an annular U-turn deflector arranged over the upper end of the swirl tube.

IV. BRIEF DESCRIPTION OF THE DRAWINGS

Figure 2:
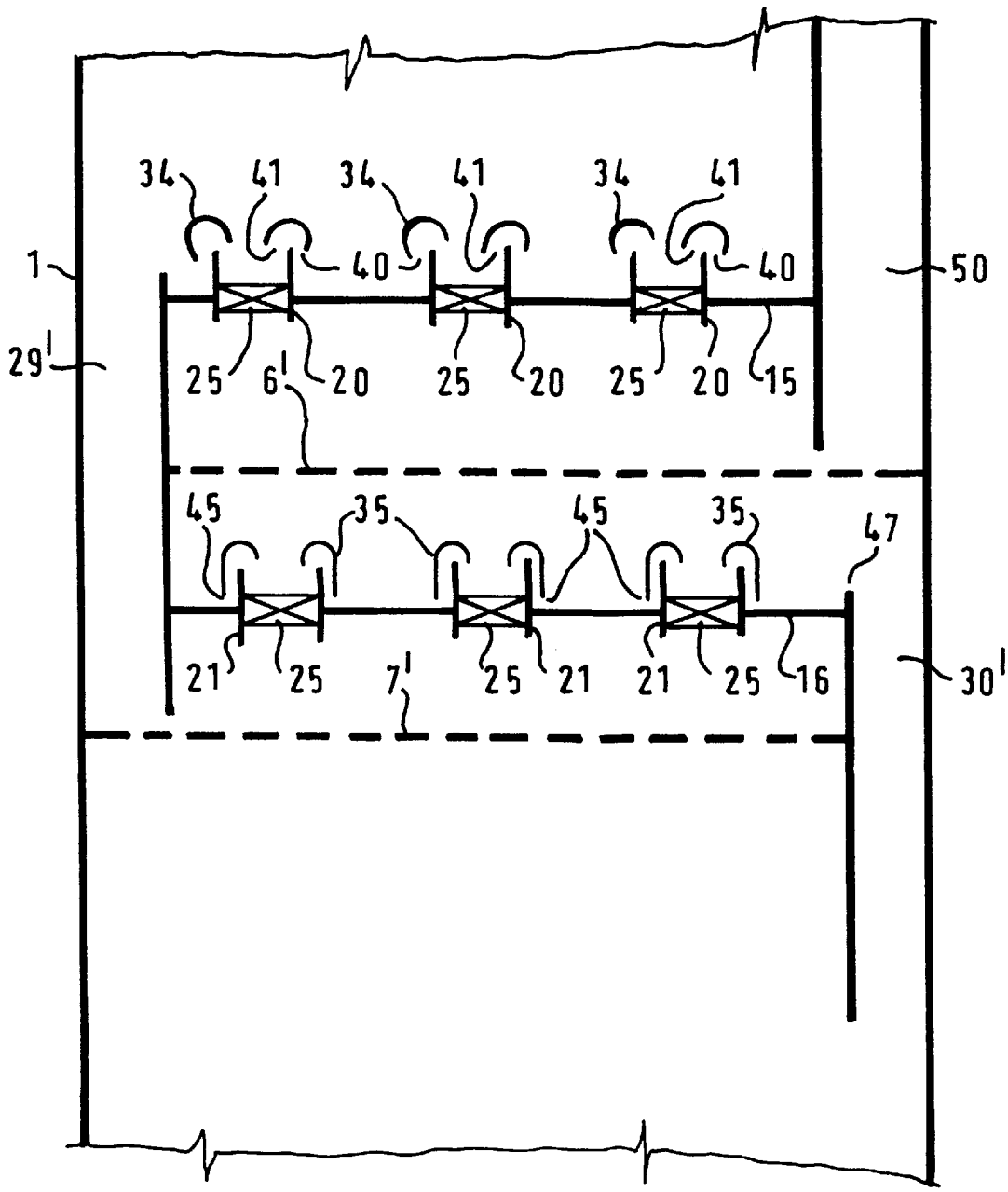

FIGS. 1 and 2 show schematically cross-sectional views of part of a column 1 for counter-currently contacting gas and liquid according to two embodiments of the present invention.

V. DETAILED DESCRIPTION OF PREFERRED EMBODIMENTS

The column is provided with inlets and outlets for fluids. The position of the inlets and outlets depends on the use of the column: when the column is used to remove contaminants from a gas mixture by counter-currently contacting the gas mixture with an absorbent liquid, the column has a gas inlet and a liquid outlet arranged in its lower end and a liquid inlet and a gas outlet arranged in its upper end, and when the column is used for distilling a feed, the column has a feed inlet arranged near its middle part, a gas inlet and a liquid outlet arranged in its lower end and a liquid inlet and a gas outlet arranged in its upper end.

Liquid droplets which break away from the liquid film at the upper end of the swirl tube are forced by the U-turn deflector to move downwards to the separation tray; therefore the liquid droplets will not normally move upwards to the next higher contact tray. Thus it is not needed that the upper ends of the swirl tubes discharge straight into the gas passages of the contact tray above the separation tray, and therefore less swirl tubes can be used having a diameter which is larger than the diameter of the gas passages in the contact tray.

A further advantage of the column according to the present invention is that the net free area of the separation tray is larger than the net free area of the known separation tray. As the pressure drop over the separation tray is proportional to the gas velocity in the swirl tubes, and as this gas velocity is inversely proportional to the net free area, the pressure drop over the separation tray is smaller than the pressure drop over the known separation tray.

VI. DETAILED DESCRIPTION OF THE DRAWINGS

The invention will now be described by way of example in more detail with reference to FIGS. 1 and 2 showing schematically cross-sectional views of part of a column 1 for counter-currently contacting gas and liquid according to the present invention provided with horizontal contact trays 5, 6, 7 and 8 arranged axially spaced apart in the column 1. The horizontal contact trays 5, 6, 7 and 8 are so-called sieve trays. A sieve tray is a flat plate provided with holes in it; for the sake of clarity the holes in the plates have not been referred to by reference numerals. The horizontal contact trays 5, 6, 7 and 8 are provided with downcomers 10, 11, 12 and 13, respectively. The downcomer 10 opens below the contact tray 5 onto the next lower contact tray 6, and so on. The tray in which downcomer 13 opens is not shown, and in practice the downcomer pertaining to lowermost separation tray of the column will open into the lower part of the column.

The column 1 is provided with a gas inlet and a liquid outlet arranged in its lower end and a liquid inlet and a gas outlet arranged in its upper end; the gas inlet, the liquid outlet, the liquid inlet and the gas outlet are not shown in the Figure.

Column 1 is furthermore provided with horizontal separation trays 15, 16 and 17, each separation tray 15, 16 or 17 being arranged above a contact tray 6, 7 or 8. The separation trays 15, 16 and 17 are provided with swirl tubes 20, 21 and 22. The swirl tubes 20, 21 and 22 are internally provided with swirl imparting means 25, for example swirl vanes. Each separation tray 15, 16 or 17 is furthermore provided with means for removing liquid from the separation tray in the form of a downcomer 29, 30 and 31. The downcomer 29 of separation tray 15 opens via downcomer 11 on the second contact tray 7 below the separation tray 15, and so on. Please note that the second contact tray below separation tray 17 is not shown, and the separation tray above contact tray 5 is not shown either.

Each swirl tube 20, 21 or 22 is provided with an annular U-turn deflector 34, 35 and 36, respectively, arranged over and extending to within the upper end of the swirl tube 20, 21 or 22.

During normal operation, gas is supplied to the column 1 through the gas inlet at the lower end of the column 1 and liquid is supplied to the column 1 through the liquid inlet at the upper end of the column 1. In the column 1 gas and liquid are contacted on the horizontal contact trays 5, 6, 7 and 8 to exchange matter and or heat, and after contacting, liquid and gas are removed from the column 1 through the gas outlet at the upper part of column 1 and through the liquid outlet at the lower part of column 1.

The performance of a column is determined by the maximum gas flow rate as a function of the liquid flow rate; wherein the maximum gas flow rate is the gas flow rate at which entrainment of liquid by the upwards flowing gas starts.

To improve the performance of the column, entrainment has to be reduced. To reduce entrainment of liquid the column 1 is provided with the separation trays 15, 16 and 17. In the swirl tubes 20, 21 and 22 of the separation trays 15, 16 and 17 the upwardly flowing gas with entrained liquid is subjected to a centrifugal motion and as a result a liquid is separated from gas. The separated liquid is collected on the inner surfaces of the swirl tubes 20, 21 and 22. At the upper ends of the swirl tubes 20, 21 and 22 the liquid will break away from the inner surfaces of the swirl tubes 20, 21 and 22. The U-turn deflectors 34, 35 and 36 direct the liquid which breaks away towards the floors of the separation trays 15, 16 and 17.

To illustrate the improved performance of the column according to the present invention, tests were carried out in a column having an internal diameter of 45 cm. In this column four contact trays were installed with a tray spacing of 600 mm. The contact trays were sieve trays with a net free area of 20%, and each contact tray was provided with a downcomer opening below the tray. The column was provided with four separation trays, each arranged directly above a contact tray. The separation trays were each provided with 5 swirl tubes having a diameter of 110 mm, and each swirl tube was provided with a U-turn deflector. The net free area of the separation tray was 50%.

The column was operated for liquid flow rates which corresponded to flow parameters in the range of from 0.05 to 0.15, wherein the flow parameter is defined as $(L/G)*(rho_l/rho_g)^{1/2}$. For these flow parameters, maximum gas flow rates corresponding to maximum load factors in the range of 0.20 to 0.18 m/s were obtained, wherein the load factor is defined as $U_g*(rho_g/(rho_l-rho_g))^{1/2}$. In the above definitions: L is the liquid flow rate in m$^3$/s, G is the gas flow rate in m$^3$/s, $rho_l$ is the liquid density in kg/m$^3$, $rho_g$ is the gas density in kg/m$^3$, and $U_g$ is the superficial gas velocity in m/s.

The pressure drop over the combination of contact tray and separation tray was between 500 and 4000 Pa.

Now two examples of columns not according to the invention are discussed. Without the separation trays, the maximum load factor was about 0.12 to 0.10 for the same flow parameters, and the pressure drop was between 250 and 2000 Pa. Consequently the column according to the invention provides a high maximum load factor at the expense of a larger pressure drop.

Replacing the separation trays in the column according to the invention by separation trays having a net free area of 20%, which is the same as the net free area of the sieve tray, and the swirl tubes by swirl tubes with no U-turn deflectors, results in a lower maximum load factor and a larger pressure drop.

To suppress gas flowing with the liquid through the U-turn, the surface area of the ring formed by the rim 40 of the U-turn deflector 34 and the outer surface of the swirl tube 20 is smaller than the surface area of the ring formed by the inner surface of the U-turn deflector 34 and the inner surface of the swirl tube 20 at the top 41 of the swirl tube 20. In an alternative embodiment, the opening of the U-turn deflector can be sealed by liquid present on the separation tray during normal operation. To this end the outer wall 45 of the U-turn deflector 35 extends to below the top of the weir 47 of the downcomer 30.

To further reduce liquid entrainment, the swirl tube 22 is provided with a droplet catcher in the form of a widening ring 49 arranged at the gas outlet end of the U-turn deflector 36.

In place of a sieve tray the contact tray can be any suitable contact tray, for example a valve tray.

In the above description of the invention, liquid removed by the separation tray 15 was returned to the contact tray 7 below the contact tray 6 to which the separation tray 15 pertains; and this also applied to the other separation trays 16 and 17. In the event that the column is operated with low liquid loads, at least part of the liquid separated by a separation tray can be returned to the contact tray to which the separation tray pertains. This can be done by using downcomer pipes arranged in openings in the separation tray, or by using one downcomer that opens on the contact tray below the separation tray.

I claim:

1. A column for counter-currently contacting gas and liquid provided with inlets and outlets for fluids, which column is provided with a plurality of horizontal contact trays arranged axially spaced apart in the column, each contact tray being provided with gas passages and a downcomer opening below the contact tray, and with a plurality of horizontal separation trays provided with swirl tubes and with means for removing liquid from the separation tray, each separation tray being arranged above a contact tray, wherein each swirl tube is provided with an annular U-turn deflector arranged over the upper end of the swirl tube and extending to within the swirl tube, and wherein the surface area of the ring formed by the inner surface of the U-turn deflector and the outer surface of the swirl tube at the top of the swirl tube is smaller than the surface area of the ring formed by the inner surface of the U-turn deflector and the inner surface of the swirl tube at the top of the swirl tube.

2. The column according to claim 1, wherein said means for removing liquid from a separation tray includes a downcomer opening below said separation tray.

3. The column according to claim 2, wherein said downcomer of a separation tray includes a weir and opens on the second contact tray below said separation tray.

4. The column according to claim 3, wherein the outer wall of said U-turn deflector extends to below the top of said weir of said downcomer.

5. The column according to claim 2, wherein said means for removing liquid from a separation tray includes downcomer pipes arranged in openings in said separation tray.

6. The column according to claim 5, wherein said swirl tubes are provided with a droplet catcher arranged at the gas outlet end of said U-turn deflector.

* * * * *